US008277049B2

(12) United States Patent
Fang et al.

(10) Patent No.: US 8,277,049 B2
(45) Date of Patent: Oct. 2, 2012

(54) PROJECTOR USING LEDS AS LIGHT SOURCES

(75) Inventors: Yi-Chin Fang, Kaohsiung (TW);
Jung-Hung Sun, Kaohsiung (TW);
Wei-Chi Lai, Kaohsiung (TW);
Hsuan-Fu Wang, Kaohsiung (TW)

(73) Assignee: National Kaohsiung First University Of Science And Technology, Kaohsiung (TW)

( * ) Notice: Subject to any disclaimer, the term of this patent is extended or adjusted under 35 U.S.C. 154(b) by 338 days.

(21) Appl. No.: 12/698,274

(22) Filed: Feb. 2, 2010

(65) Prior Publication Data
US 2011/0188001 A1 Aug. 4, 2011

(51) Int. Cl.
*G03B 21/00* (2006.01)
*G03B 21/28* (2006.01)
(52) U.S. Cl. .......................................... 353/33; 353/81
(58) Field of Classification Search .............. 353/30–31, 353/33, 81, 85, 94
See application file for complete search history.

(56) References Cited

U.S. PATENT DOCUMENTS

| 2,945,413 | A * | 7/1960 | Kelly | 359/583 |
| 7,270,425 | B2 * | 9/2007 | Arai et al. | 353/87 |
| 7,303,291 | B2 * | 12/2007 | Ikeda et al. | 353/102 |
| 2001/0048562 | A1 * | 12/2001 | Bartlett et al. | 359/636 |
| 2005/0185419 | A1 * | 8/2005 | Holman et al. | 362/561 |
| 2006/0152931 | A1 * | 7/2006 | Holman | 362/297 |
| 2006/0215123 | A1 * | 9/2006 | Aoki | 353/31 |
| 2007/0206164 | A1 * | 9/2007 | Beeson et al. | 353/94 |
| 2009/0040463 | A1 * | 2/2009 | Chen et al. | 353/20 |

OTHER PUBLICATIONS

Wei-Chi Lai, English Abstract,Design and Simulation of Optical-Engine of DLP projection system with High-Power LEDs, Feb. 6, 2009, Department of Mechanical and Automation Engineering, National Kaohsiung First University of Science and Technology.
Wei-Chi Lai, Chinese Abstract,Design and Simulation of Optical-Engine of DLP projection system with High-Power LEDs, Feb. 6, 2009, Department of Mechanical and Automation Engineering, National Kaohsiung First University of Science and Technology.

* cited by examiner

*Primary Examiner* — Tony Ko
*Assistant Examiner* — Jori S Reilly-Diakun
(74) *Attorney, Agent, or Firm* — WPAT, P.C.; Anthony King

(57) ABSTRACT

A projector is provided, which includes a red substrate, a green substrate, a blue substrate, an X-cube, an electronic control element, a light guide element, a light valve element, and a projection lens. The red substrate, the green substrate, and the blue substrate respectively illuminate three surfaces of the X-cube, and the light is mixed in the X-cube and then exits from a light emitting surface. The electronic control element controls the red substrate, the green substrate, and the blue substrate. The light guide element is used for reflecting the light from the light emitting surface of the X-cube. The light valve element is used for reflecting the light from the light guide element back to the light guide element, and the light passes through the light guide element and then projected by the projection lens onto a projection plane area. Thereby, the ON/OFF switch time of the present invention is shortened, the temperature may not get over high, the optical efficiency is enhanced, and the whole volume is significantly reduced.

14 Claims, 6 Drawing Sheets

PROJECTOR USING LEDS AS LIGHT SOURCES

BACKGROUND OF THE INVENTION

1. Field of the Invention

The present invention relates to a projector, and more particularly to a projector using LEDs as light sources.

2. Description of the Related Art

FIG. 1 shows a schematic view of a conventional projector. The projector 1 includes a white lamp 11, a condenser lens 12, a color wheel 13, an integrator rod 14, a relay lens 15, a total internal reflection prism 16, a digital micromirror device (DMD) 17, and a projection lens 18.

The white lamp 11 is employed for generating white light. The white light is accommodated by the condenser lens 12, and passes through the color wheel 13 having red, green, and blue (RGB) color zones, so as to generate consecutive and fast alternating RGB color fields. Next, the light passes through the integrator rod 14 and the relay lens 15 for uniformity. The uniform light then passes through the total internal reflection prism 16, and is reflected by the total internal reflection prism 16 to the DMD 17. Finally, the light is reflected by the DMD 17, passes through the total internal reflection prism 16, and enters the projection lens 18. The projection lens 18 projects the light onto a projection plane area (not shown).

In the projector 1, the white lamp 11 may be a tungsten-halogen lamp or a high-intensity discharge lamp (HID lamp). The tungsten-halogen lamp is unable to generate a high luminance. The HID lamp includes a xenon lamp, a metal-halide lamp, and an ultra-high-pressure (UHP) mercury lamp. The xenon lamp is advantageous in having a flat spectrum in the visible light range, desirable color temperature (about 6000 k), short warm-up time, and perfect chromatic value, but disadvantageous in having a low light-emitting efficiency, short service life, high price, and generation of excessive heat during operation.

The metal-halide lamp achieves a higher light-emitting efficiency (about 65 to 75 lumens/watt) and has a perfect chromatic value, but is disadvantageous in having a long arc, excessively long warm-up time, short service life, generation of various colors by the arc at different positions, and generation of a large amount of heat. The UHP mercury lamp has a short arc, long service life, and high light-emitting efficiency, but is rather expensive and unsafe in use due to its potential explosion hazard.

Moreover, since the projector 1 uses the white lamp 11 as its light source, the color wheel 13 is adopted to control the color, and a motor is required to drive the color wheel 13. Therefore, the projector 1 has too many elements, and the volume of the projector 1 becomes too large. Besides, two-thirds of the light flux is lost when the light passes through the color wheel 13.

Therefore, it is necessary to provide a projector using LEDs as light sources to solve the above problems, minimize volumetric size and promote light efficiency of projectors.

SUMMARY OF THE INVENTION

The present invention provides a projector, which comprises a red substrate, a green substrate, a blue substrate, an X-cube, an electronic control element, a light guide element, a light valve element, and a projection lens. The red substrate has a plurality of red LEDs arranged in an array and emitting red light into specific directions. The green substrate has a plurality of green LEDs arranged in an array and emitting green light into specific directions. The blue substrate has a plurality of blue LEDs arranged in an array and emitting blue light into specific directions. The X-cube has a first surface, a second surface, a third surface, and a light emitting surface. The red substrate, the green substrate, and the blue substrate respectively illuminate the first surface, the second surface, and the third surface, and the light is mixed in the X-cube and then exit from the light emitting surface. The electronic control element is electrically connected to the red substrate, the green substrate, and the blue substrate for controlling the same. The light guide element is used for reflecting the light from the light emitting surface of the X-cube. The light valve element is used for reflecting the light from the light guide element back to the light guide element and passing through the light guide element. The projection lens is used for projecting the light passing through the light guide element onto a projection plane area.

Therefore, the projector of the present invention uses LEDs as its light sources, so that the ON/OFF switch time is shortened, the temperature may not get over high due to special LED array designed in this invention, and the service life may reach 100,000 hours. In addition, since the conventional color wheel is omitted, the optical efficiency is enhanced, and the whole volume is significantly reduced.

DETAILED DESCRIPTION OF THE INVENTION

Figure 2:
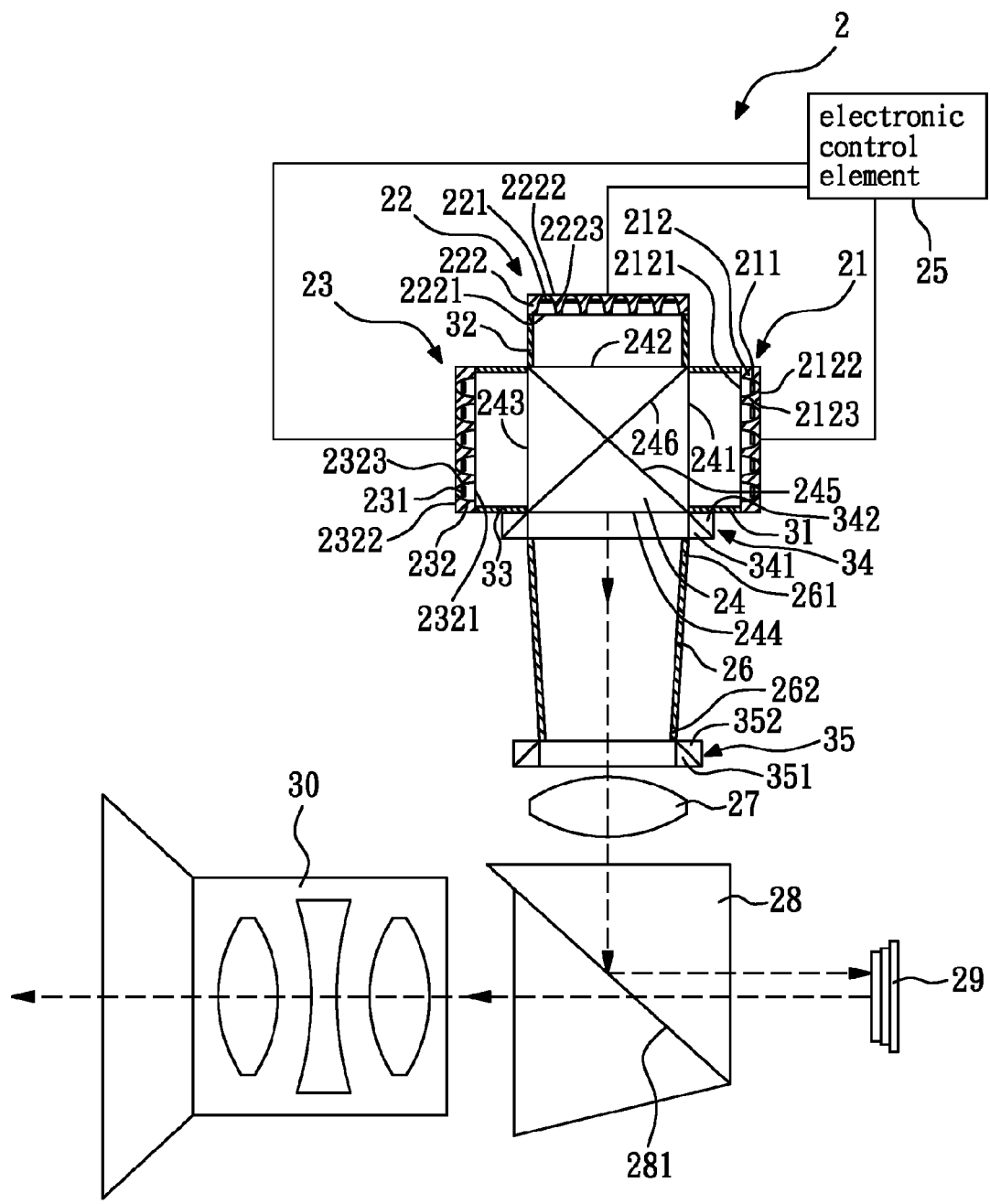
FIG. 2 is a schematic view of a projector according to a preferred embodiment of the present invention.

FIG. 2 shows a schematic view of a projector according to a preferred embodiment of the present invention. The projector 2 comprises a red substrate 21, a green substrate 22, a blue substrate 23, an X-cube 24, an electronic control element 25, an integrator rod 26, a relay lens 27, a light guide element 28, a light valve element 29, and a projection lens 30.

Figure 3:
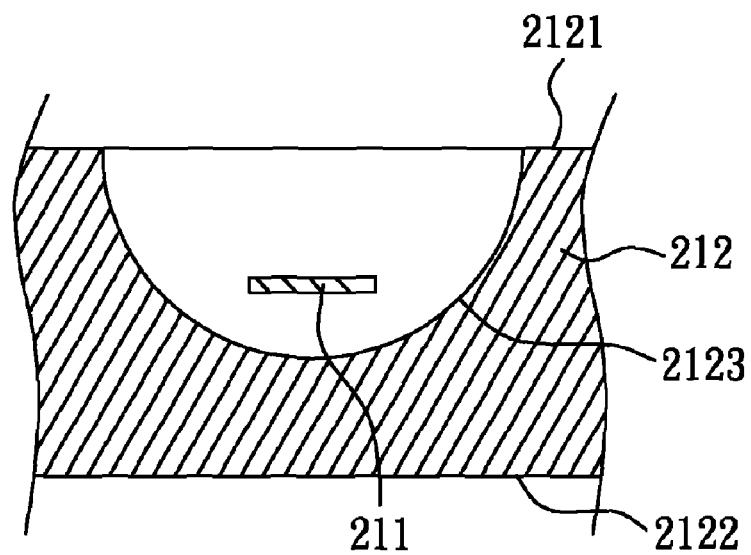
FIG. 3 is a schematic cross-sectional view of an accommodating hole on a red substrate according to the present invention, in which the accommodating hole has an elliptic cross-section.
Figure 4:
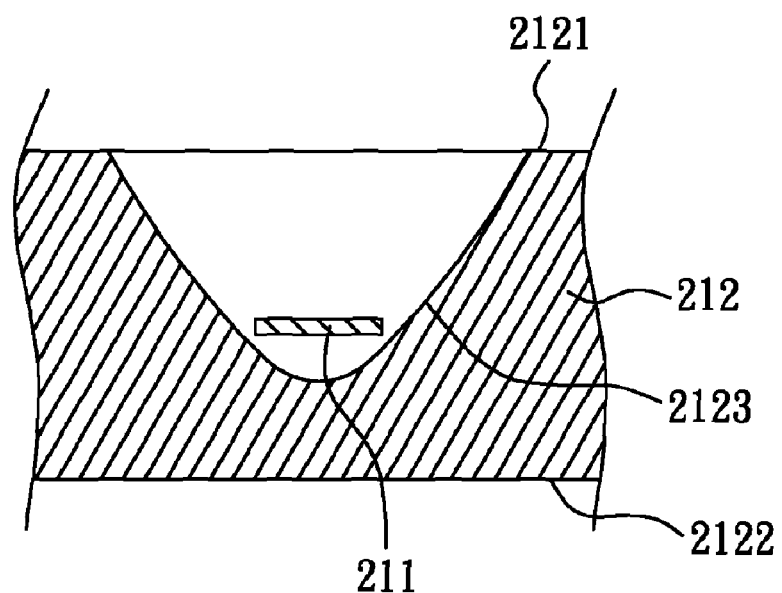
FIG. 4 is a schematic cross-sectional view of an accommodating hole on the red substrate according to the present invention, in which the accommodating hole has a parabolic cross-section.

The red substrate 21 has a plurality of red LEDs 211 arranged in an array and emitting red light into specific directions. In this embodiment, the red substrate 21 further includes a first substrate body 212 having a first surface 2121, a second surface 2122, and a plurality of accommodating holes 2123. The material of the first substrate body 212 is metal that can dissipate the heat generated by the red LEDs 211. The accommodating holes 2123 are opened on the first surface 2121, and used for accommodating the red LEDs 211 and reflecting the red light emitted by the red LEDs 211 so as to emit the red light from the first surface 2121. Preferably, the accommodating holes 2123 have elliptic cross-sections (as shown in FIG. 3) or parabolic cross-sections (as shown in FIG. 4), and have a coating layer (not shown) thereon.

The green substrate 22 has a plurality of green LEDs 221 arranged in an array and emitting green light into specific directions. In this embodiment, the green substrate 22 further includes a second substrate body 222 having a first surface 2221, a second surface 2222, and a plurality of accommodating holes 2223. The material of the second substrate body 222 is metal that can dissipate the heat generated by the green LEDs 221. The accommodating holes 2223 are opened on the first surface 2221, and used for accommodating the green LEDs 221 and reflecting the green light emitted by the green LEDs 221 so as to emit the green light from the first surface 2221. Preferably, the accommodating holes 2223 have elliptic or parabolic cross-sections, and have a coating layer (not shown) thereon.

The blue substrate 23 has a plurality of blue LEDs 231 arranged in an array and emitting blue light into specific directions. In this embodiment, the blue substrate 23 further includes a third substrate body 232 having a first surface 2321, a second surface 2322, and a plurality of accommodating holes 2323. The material of the third substrate body 232 is metal that can dissipate the heat generated by the blue LEDs 231. The accommodating holes 2323 are opened on the first surface 2321, and used for accommodating the blue LEDs 231 and reflecting the blue light emitted by the blue LEDs 231 so as to emit the blue light from the first surface 2321. Preferably, the accommodating holes 2323 have elliptic or parabolic cross-sections, and have a coating layer (not shown) thereon.

Figure 5:
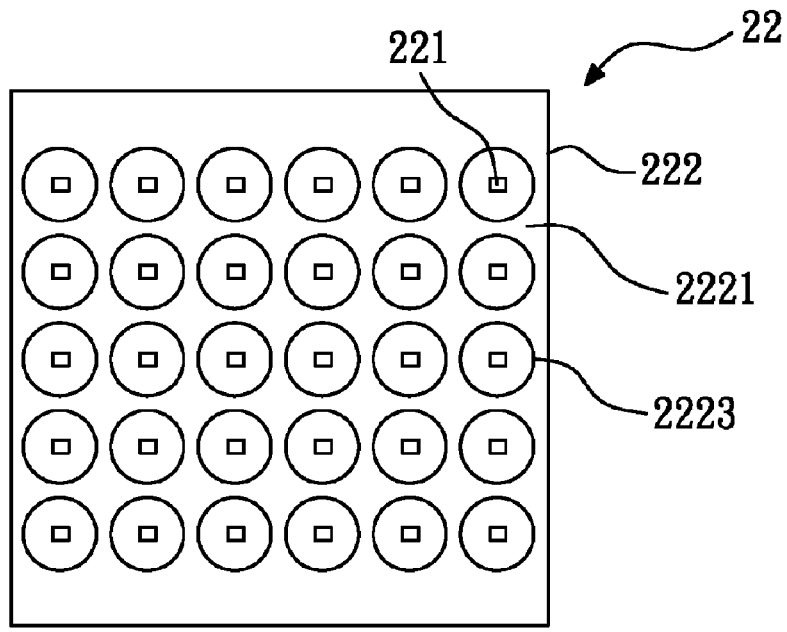
FIG. 5 is a schematic top view of a first type of a green substrate according to the present invention.
Figure 6:
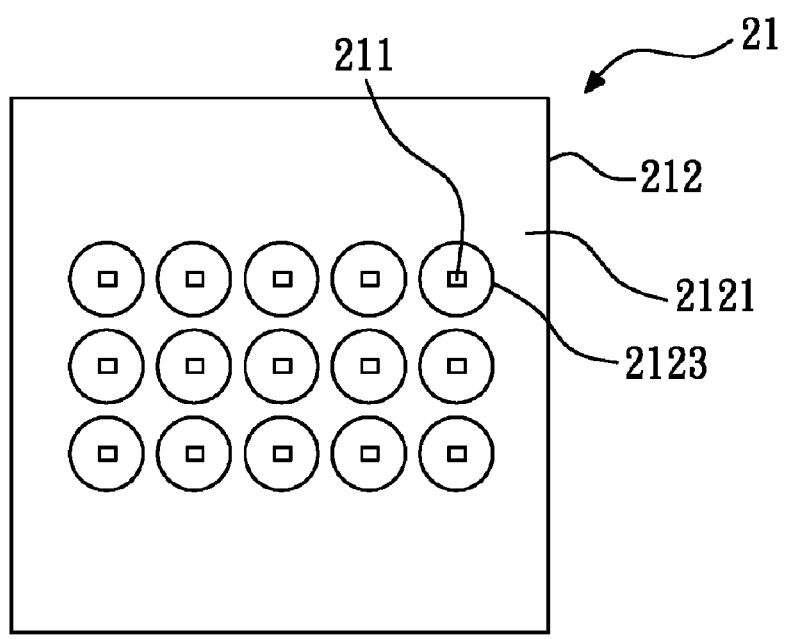
FIG. 6 is a schematic top view of a first type of the red substrate according to the present invention.

FIG. 5 shows a schematic top view of a first type of the green substrate according to the present invention. On the green substrate 22, the green LEDs 221 are arranged in a rectangle. FIG. 6 shows a schematic top view of a first type of the red substrate according to the present invention. On the red substrate 21, the red LEDs 211 are arranged in a rectangle. It should be noted that, on the blue substrate 23, the number and arrangement of the blue LEDs 231 are the same as those of the red LEDs 211 on the red substrate 21. Preferably, a quantity ratio of the red LEDs 211, the green LEDs 221, and the blue LEDs 231 is 1:2:1.

Figure 7:
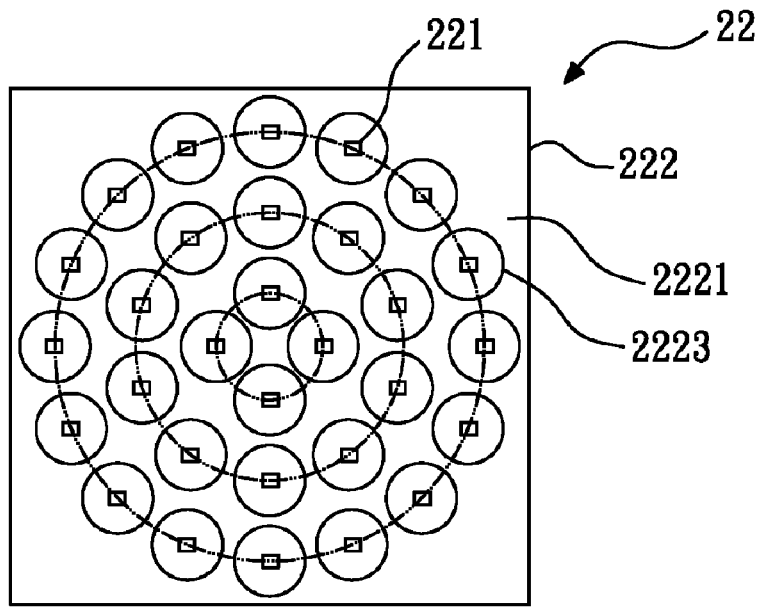
FIG. 7 is a schematic top view of a second type of the green substrate according to the present invention.
Figure 8:
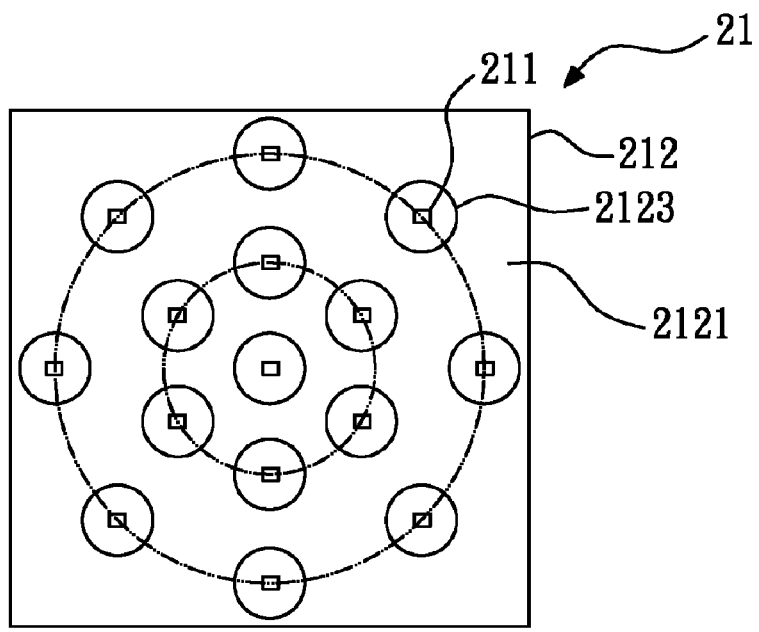
FIG. 8 is a schematic top view of a second type of the red substrate according to the present invention.

FIG. 7 shows a schematic top view of a second type of the green substrate according to the present invention. On the green substrate 22, the green LEDs 221 are arranged in a plurality of concentric circles. FIG. 8 shows a schematic top view of a second type of the red substrate according to the present invention. On the red substrate 21, the red LEDs 211 are arranged in a plurality of concentric circles. It should be noted that, on the blue substrate 23, the number and arrangement of the blue LEDs 231 are the same as those of the red LEDs 211 on the red substrate 21. Similarly, a quantity ratio of the red LEDs 211, the green LEDs 221, and the blue LEDs 231 is 1:2:1.

Further referring to FIG. 2, the X-cube 24 has a first surface 241, a second surface 242, a third surface 243, a light emitting surface 244 and two cemented surfaces 245, 246. The red substrate 21, the green substrate 22, and the blue substrate 23 respectively illuminate the first surface 241, the second surface 242, and the third surface 243, and the light from the red substrate 21, the green substrate 22, and the blue substrate 23 is mixed in the X-cube 24 and then exit from the light emitting surface 244. The X-cube 24 adopts a coating technology to make light of different wavelengths have different refraction and transmittance properties. In this embodiment, the X-cube 24 reflects the red light and the blue light, and allows the green light to pass through, so that the light paths can be combined to fulfill the synthesis of the light sources. The two cemented surfaces 245, 246 have a special coating (not shown) thereon, and the thickness of the special coating varies gradually. That is, the thickness of the special coating is not even.

The electronic control element 25 (such as a Digital Signal Processing) is electrically connected to the red substrate 21, the green substrate 22, and the blue substrate 23, and used for controlling the red LEDs 211, the green LEDs 221, and the blue LEDs 231. The light emitted by the LEDs is mixed in the X-cube 24 so to obtain the desired light.

Preferably, the projector 2 further comprises a first frame 31, a second frame 32, and a third frame 33. The first frame 31 is a hollow frame having two ends respectively connected to the first surface 2121 of the first substrate body 212 of the red substrate 21 and the first surface 241 of the X-cube 24, so that the light emitted by the red LEDs 211 can illuminate the first surface 241 of the X-cube 24. It is to be noted that there are special optical designs on the internal wall of the first frame 31. The special optical designs are mirror with micro-optics or mirror with special designed coating on it. The second frame 32 is a hollow frame having two ends respectively connected to the first surface 2221 of the second substrate body 222 of the green substrate 22 and the second surface 242 of the X-cube 24, so that the light emitted by the green LEDs 221 can be illuminate the second surface 242 of the X-cube 24. It is to be noted that there are special optical designs on the internal wall of the second frame 32. The special optical designs are mirror with micro-optics or mirror with special designed coating on it. The third frame 33 is a hollow frame having two ends respectively connected to the first surface 2321 of the third substrate body 232 of the blue substrate 23 and the third surface 243 of the X-cube 24, so that the light emitted by the blue LEDs 231 can be illuminate the third surface 243 of the X-cube 24. It is to be noted that there are special optical designs on the internal wall of the third frame 33. The special optical designs are mirror with micro-optics or mirror with special designed coating on it. The above-mentioned special optical design of mirrors with micro-optics or coating is intended to direct light to be more telecentric when the light exit from the light emitting surface 244 of the X-cube 24.

Preferably, the red substrate 21, the green substrate 22, the blue substrate 23, the X-cube 24, the first frame 31, the second frame 32 and the third frame 33 are combined together to form an optical element.

Figure 9:
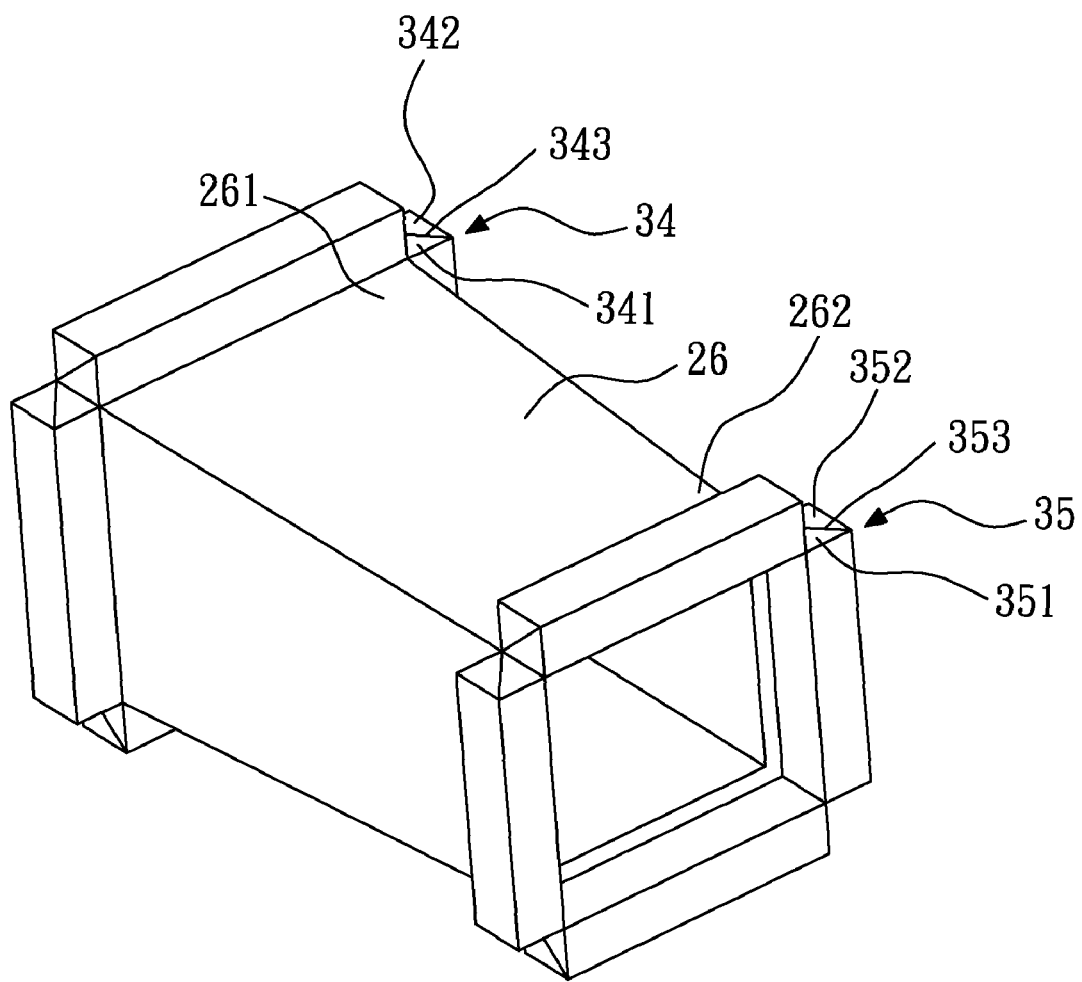
FIG. 9 is a schematic perspective view of an integrator rod according to the present invention.

The integrator rod 26 is located between the X-cube 24 and the light guide element 28, and used for uniformizing the light from the light emitting surface 244 of the X-cube 24. The integrator rod 26 has a light-incident port 261, a light-emitting port 262, and a microstructure (not shown). The cross-sectional area of the light-incident port 261 is greater than that of the light-emitting port 262, and the microstructure is located inside the integrator rod 26. When light enters the integrator rod 26 through the light-incident port 261, the light is reflected many times by the microstructure and then emitted from the light-emitting port 262 as uniformized light. The integrator rod 26 may be a hollow or solid structure. The hollow structure causes reflections through a highly reflective coating on the microstructure (mirror) disposed on each internal wall, and the solid structure causes reflections through total internal reflection between the material and the air. In this embodiment, the integrator rod 26 is a hollow structure, as shown in FIG. 9.

Preferably, the projector 2 further comprises four first prism sets 34 and four second prism sets 35. The first prism sets 34 are disposed between the X-cube 24 and the light-incident port 261 of the integrator rod 26. The first prism sets 34 surround the light-incident port 261 so as to reflect missing light from the X-cube 24 into the integrator rod 26. Each first prism set 34 includes a first glass prism 341, a second glass prism 342 and a cemented surface 343. The materials and refractive indexes of the first glass prism 341 and the second glass prism 342 are different. The first glass prism 341 and the second glass prism 342 are combined so as to form the cemented surface 343 therebetween. The cemented surface 343 has a special coating (not shown) thereon, and the thickness of the special coating varies gradually. That is, the thickness of the special coating is not even.

The second prism sets 35 are disposed between the light-emitting port 262 of the integrator rod 26 and the relay lens 27. The second prism sets 35 surround the light-emitting port 262 so as to reflect missing light from the integrator rod 26 into the relay lens 27. Each second prism set 35 includes a third glass prism 351, a fourth glass prism 352 and a cemented surface 353. The materials and refractive indexes of the third glass prism 351 and the fourth glass prism 352 are different. The third glass prism 351 and the fourth glass prism 352 are combined so as to form the cemented surface 353 therebetween. The cemented surface 353 has a special coating (not shown) thereon, and the thickness of the special coating varies gradually. That is, the thickness of the special coating is not even.

The relay lens 27 is located between the integrator rod 26 and the light guide element 28. As light is diverged after passing through the integrator rod 26, the relay lens 27 is needed to make the light from the integrator rod 26 converged to the light guide element 28. It can be understood that, the relay lens 27 may include one or more lenses.

The light guide element 28 is used for reflecting the light from the light emitting surface 244 of the X-cube 24 to the light valve element 29. In this embodiment, the light guide element 28 is a total internal reflection prism having a total internal reflection surface 281. The total internal reflection surface 281 is used for reflecting the light from the light emitting surface 244 of the X-cube 24 to the light valve element 29.

The light valve element 29 is used for reflecting the light from the light guide element 28 back to the light guide element 28 and passing through the total internal reflection surface 281 of the light guide element 28. The light valve element 29 may be a DMD or a complementary metal-oxide semiconductor (CMOS) image sensor. In this embodiment, the light valve element 29 is a DMD having a reference surface and a plurality of microlenses. The microlenses may rotate independently relative to the reference surface, so that the DMD may be switched to obtain a desired pattern.

The projection lens 30 is used for projecting the light passing through the light guide element 28 onto a projection plane area (or a screen) (not shown).

Referring to FIG. 2 again, the operation of the projector 2 is described as follows. The electronic control element 25 is used for controlling the LEDs on the red substrate 21, the green substrate 22, and the blue substrate 23. The light emitted by the LEDs is mixed in the X-cube 24 to obtain a desired light color and then emitted from the light emitting surface 244 of the X-cube 24. Next, the light passes through the integrator rod 26 and the relay lens 27 for uniformization. The uniformized light then enters the total internal reflection prism 28, and is reflected by the total internal reflection prism 28 to the DMD 29. Finally, the light is reflected by the DMD 29, passes through the total internal reflection prism 28, and enters the projection lens 30. The projection lens 30 projects the light onto a projection plane area (or a screen) (not shown).

Figure 1:
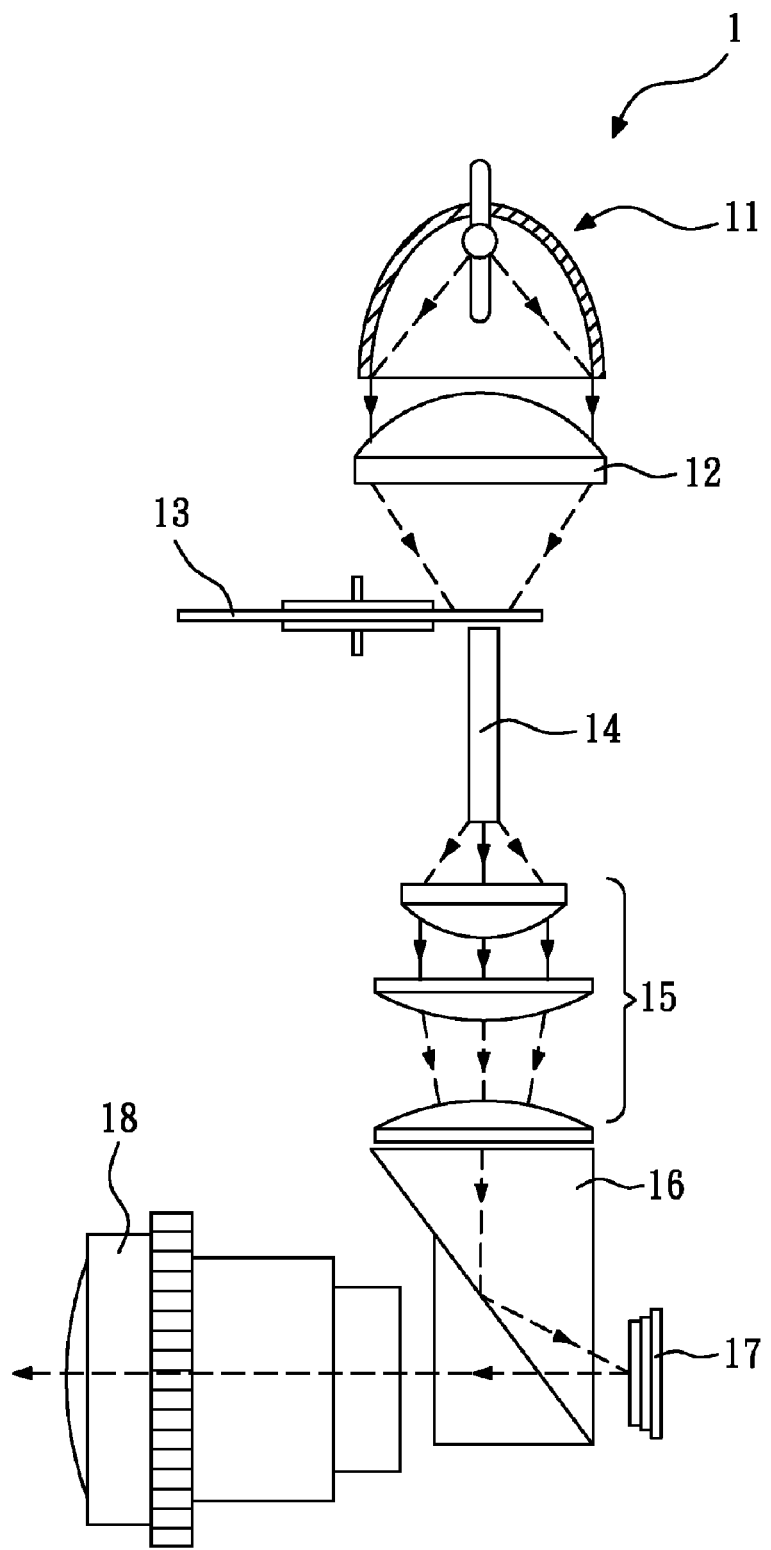
FIG. 1 is a schematic view of a conventional projector.

The advantages of the projector 2 are described as follows. The projector 2 uses LEDs as its light sources, so that the ON/OFF switch time is shortened, the temperature may not get over high due to special optical design of LED lens array in this invention, and the service life may reach 100,000 hours. In addition, the projector 2 uses the X-cube 24 together with the LEDs, and the conventional color wheel 13 (as shown in FIG. 1) is omitted, so that the optical efficiency is enhanced, and the whole volume is significantly reduced.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:
1. A projector, comprising:
a red substrate, having a plurality of red light-emitting diodes (LEDs) arranged in an array and emitting red light into specific directions;
a green substrate, having a plurality of green LEDs arranged in an array and emitting green light into specific directions;
a blue substrate, having a plurality of blue LEDs arranged in an array and emitting blue light into specific directions;
an X-cube, having a first surface, a second surface, a third surface, and a light emitting surface, wherein the red substrate, the green substrate, and the blue substrate respectively illuminate the first surface, the second surface, and the third surface, and the light from the red substrate, the green substrate, and the blue substrate is mixed in the X-cube and then exit from the light emitting surface;
an electronic control element, electrically connected to the red substrate, the green substrate, and the blue substrate for controlling the same;
a light guide element, for reflecting the light from the light emitting surface of the X-cube;
an integrator rod, disposed between the X-cube and the light guide element, and used for uniformizing the light from the light emitting surface of the X-cube;
four first prism sets, surrounding a light-incident port of the integrator rod, wherein each first prism set includes a first glass prism, a second glass prism and a cemented surface, the materials and refractive indexes of the first glass prism and the second glass prism are different, the first glass prism and the second glass prism are combined so as to form the cemented surface therebetween, the cemented surface has a special coating thereon, and the thickness of the special coating varies gradually;
four second prism sets, surrounding a light-emitting port of the integrator rod, wherein each second prism set includes a third glass prism, a fourth glass prism and a cemented surface, the materials and refractive indexes of the third glass prism and the fourth glass prism are different, the third glass prism and the fourth glass prism are combined so as to form the cemented surface therebetween, the cemented surface has a special coating, and the thickness of the special coating varies gradually;
a light valve element, for reflecting the light from the light guide element back to the light guide element and passing through the light guide element; and a projection lens, for projecting the light passing through the light guide element onto a projection plane area.

2. The projector according to claim 1, wherein the red substrate further comprises a first substrate body having a first surface, a second surface, and a plurality of accommodating holes, and the accommodating holes are opened on the first surface and used for accommodating the red LEDs and reflecting the red light emitted by the red LEDs.

3. The projector according to claim 2, wherein the material of the first substrate body is metal, and the accommodating holes have elliptic or parabolic cross-sections.

4. The projector according to claim 1, wherein the green substrate further comprises a second substrate body having a first surface, a second surface, and a plurality of accommodating holes, and the accommodating holes are opened on the first surface and used for accommodating the green LEDs and reflecting the green light emitted by the green LEDs.

5. The projector according to claim 4, wherein the material of the second substrate body is metal, and the accommodating holes have elliptic or parabolic cross-sections.

6. The projector according to claim 1, wherein the blue substrate further comprises a third substrate body having a first surface, a second surface, and a plurality of accommodating holes, and the accommodating holes are opened on the first surface and used for accommodating the blue LEDs and reflecting the blue light emitted by the blue LEDs.

7. The projector according to claim 6, wherein the material of the third substrate body is metal, and the accommodating holes have elliptic or parabolic cross-sections.

8. The projector according to claim 1, wherein a quantity ratio of the red LEDs, the green LEDs, and the blue LEDs is 1:2:1.

9. The projector according to claim 1, further comprising a first frame, a second frame, and a third frame, wherein the first frame is connected to the red substrate and the first surface of the X-cube, the second frame is connected to the green substrate and the second surface of the X-cube, and the third frame is connected to the blue substrate and the third surface of the X-cube.

10. The projector according to claim 9, wherein the first frame has minor with micro-optics or minor with special designed coating on it, the second frame has mirror with micro-optics or minor with special designed coating on it, and the third frame has mirror with micro-optics or minor with special designed coating on it.

11. The projector according to claim 1, wherein an internal wall of the integrator rod has minor with micro-optics or minor with special designed coating on it.

12. The projector according to claim 1, further comprising a relay lens, disposed between the integrator rod and the light guide element, and used for converging the light from the integrator rod to the light guide element.

13. The projector according to claim 1, wherein the light guide element is a total internal reflection prism.

14. The projector according to claim 1, wherein the light valve element is a digital micromirror device (DMD) or a complementary metal-oxide semiconductor (CMOS) image sensor.

* * * * *